Aug. 25, 1970     J. OPPENHEIMER     3,525,543
ADJUSTABLE LOCK SUPPORT
Filed Oct. 25, 1967
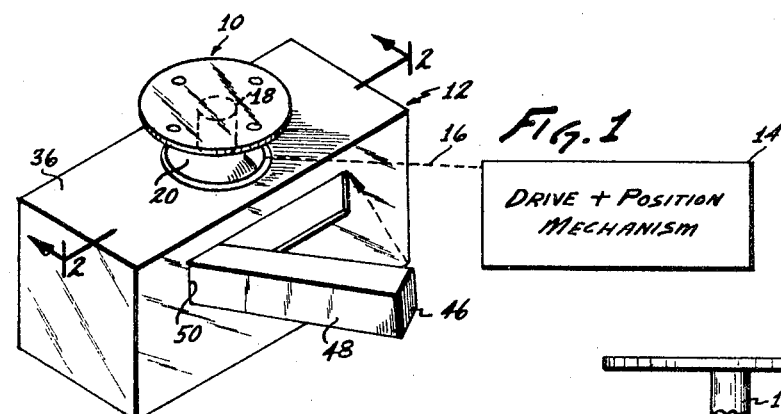
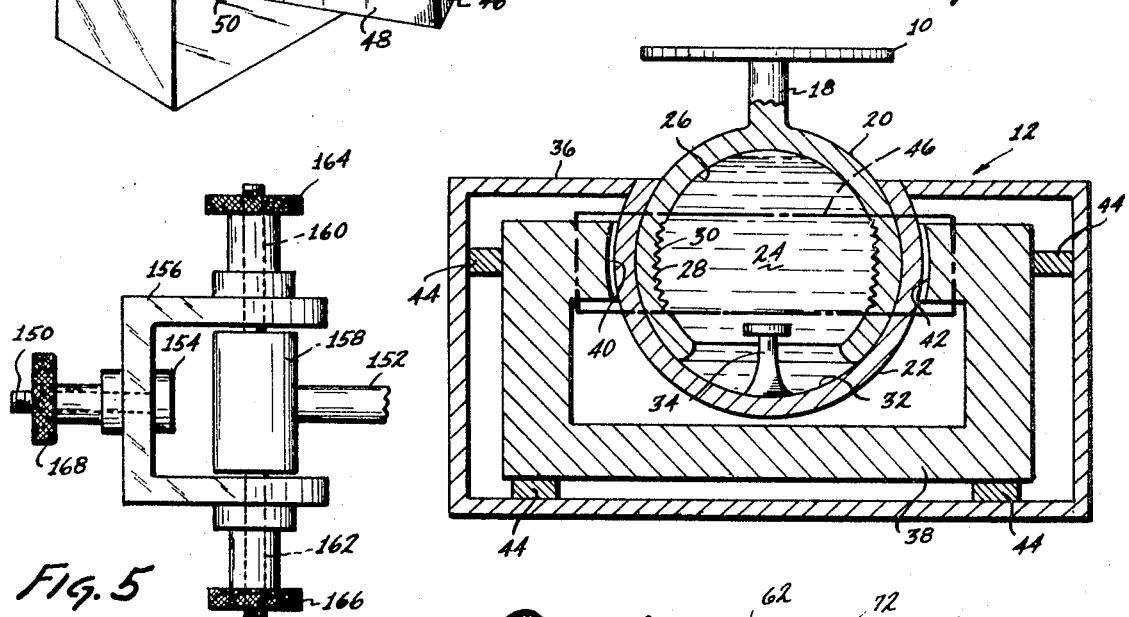
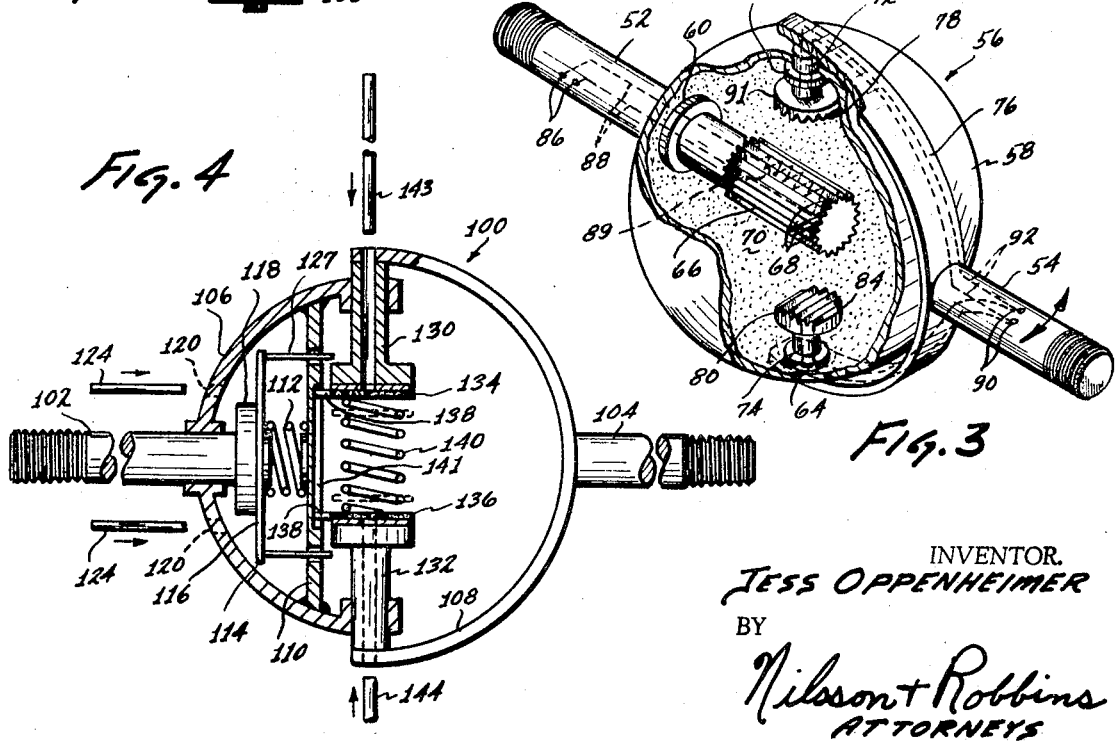
INVENTOR.
JESS OPPENHEIMER
BY
Nilsson + Robbins
ATTORNEYS

United States Patent Office 3,525,543
Patented Aug. 25, 1970

---

3,525,543
ADJUSTABLE LOCK SUPPORT
Jess Oppenheimer, 549 Moreno Ave.,
Los Angeles, Calif. 90049
Filed Oct. 25, 1967, Ser. No. 677,917
Int. Cl. B25g 3/38
U.S. Cl. 287—99                             4 Claims

ABSTRACT OF THE DISCLOSURE

Supports are disclosed incorporating a mechanical coupling, e.g. a universal joint, which will accommodate substantial relative motion between a pair of shafts, for cooperative action with means for locking the coupling in any of an infinite variety of position relationships. Specifically, ball-socket and dual-pivot couplings are disclosed in combination with mechanical locking, and liquid-solid locking means controlled by both temperature and magnetic flux. The support is disclosed both as a platform and as a shaft junction.

BACKGROUND AND SUMMARY OF THE INVENTION

In a wide variety of different applications, the need frequently arises for a support structure to hold or establish a particular physical relationship between mechanical elements. For example, in the metal-shaping arts, various-type tables are employed to support a workpiece while it is being machined. Specifically, for example, milling machines conventionally include a worktable which moves in relation to a revolving cutter so as to accomplish various cuts in the workpiece. Customarily, a significant portion of the available production time for such machines is spent mounting the workpiece on the supporting work table. This set-up time is usually increased considerably when the machine is used to cut a compound angle in relation to the surface upon which the workpiece is supported. That is, if the workpiece must be supported at a complex angle relative to the support table, considerable time may be required to set up the workpiece and otherwise prepare for the actual cutting operation.

In making angular cuts, as considered above, various accessories as holders or sine plates have been used to hold workpieces on a support table. Of the various types of sine plates in use, some are tiltable about only one axis. Various structures have also been proposed in the past which are adjustable about two axes in spaced quadrature to accommodate compound angular positioning. In general, the compound structures incorporate complex locking means requiring considerable time and effort to set the structure at a particular compound angle. Fore example, some prior conventional structures have required that threaded fasteners be turned into locking engagement to establish a particular position. Other support structures have utilized various locking arrangements or fasteners of either, greater complexity or severely-limited capability. Therefore, a considerable need exists for an improved support structure which is mechanically simple, easy and fast to adjust and which is capable of supporting substantial loads.

The need for an adjustable support structure is not limited to the metal-shaping art selected for exemplary consideration. Rather, the neede for adjustability arises in many applications of almost every form of a support apparatus. In this regard, the support contemplated may be provided variously as: a platform, a column, a hanger, or so on.

In general, the present invention comprises a support structure including a variable mechanical coupling, along with means for locking the variable coupling in any of a variety of different positions.

The locking structure may include a substance which is liquified to permit adjustment, and solidified to accomplish locking engagement. The substance may be changed, for example, by heat or magnetic flux. In other arrangements, the locking structure may comprise mechanical elements, as a spring-biased lock structure.

BRIEF DESCRIPTION OF THE DRAWINGS

In the drawings, which constitute a part of this specification, exemplary embodiments demonstrating various objectives and features hereoef are set forth, specifically:

FIG. 1 is a perspective and diagrammatic view of a structure constructed in accordance with the present invention;

FIG. 2 is a vertical sectional view taken along line 2—2 of FIG. 1;

FIG. 3 is a fragmentary, sectioned perspective view of another structure incorporating the principles of the present invention;

FIG. 4 is a sectional view of still another structure incorporating the principles of the present invention; and FIG. 5 is a plan view of still another structure incorporating the principles of the present invention.

DESCRIPTION OF THE ILLUSTRATIVE EMBODIMENTS

As required, detailed illustrative embodiments of the invention are disclosed herein. However, it is to be understood that the embodiments merely exemplify the invention which may be embodied in any of a wide variety of different forms that are radically different from the illustrative embodiments hereof. Therefore, specific structural and functional details disclosed herein are not to be interpreted as limiting the scope hereof, but rather are presented merely as a basis for the claims herein defining the scope of the invention.

Referring initially of FIG. 1, there is shown a platform 10 supported by a base block 12. The platform 10 is mechanically coupled to the base block 12 to accommodate movement of the platform 10 about either or both of two horizontally perpendicular axes so as to establish a desired angular offset. As described below, the apparatus of FIG. 1 additionally includes structure for locking the platform 10 in a selected position with respect to the base block 12 so as to afford support in the desired angular position.

In an exemplary application, the apparatus of FIG. 1 may comprise a compound sine plate as employed in the metal-shaping arts. In such an application, the base block 12 would be affixed to a work table, then the platform 10 would support a workpiece in a desired compound angle. The structure may include precision drive and positioning structure for variously setting the platform 10 in relation to the base block 12 as well known in the art. In that regard, a mechanism 14 (in block form) is indicated to be connected to the platform 10 by a dashed line 16 representing a mechanical coupling. A wide variety of different precision adjustment mechanisms are well known and widely used. For example, one such mechanism which may be readily adapted to function as the mechanism 14 is shown and described in U.S. Pat. 3,273,879.

Considering the structure of FIG. 1 in greater detail, reference will now be made to the sectional view of FIG. 2 showing the interior of the base block 12 along with the support structure for the platform 10. Specifically, the circular-plate platform 10 is affixed to a cylindrical post 18 which is integral with an internal spherical shell 20 that is matingly received in a spherical socket 22. Thus, the shell 20 and the socket 22 mutually define a closed space which is occupied by a substance that can be liquified or solidified. The substance 24 may take a variety of forms; however, in the present embodiment of FIGS. 1 and 2, it comprises a relatively heavy oil with minute magnetic particles dispersed therein as known in the clutch and brake arts. When the substance 24 is subjected to a magnetic field it is essentially solid; however, upon removal of the field, the substance 24 becomes a somewhat viscous liquid.

The internal surface 26 of the shell 20 defines a plurality of annular, alternate ridges 28 and grooves 30. When the substance 24 is solidified the shell 20 is locked thereto by positive meshed engagement with the ridges 28. In a somewhat similar fashion, the lower interior surface 31 of the socket 22 defines a projection 34 for positive engagement with the substance 24.

The external socket 22 is rigidly mounted in a housing 36 defining the base block 12. The housing 36 also contains a permanent magnet 38 of "horseshoe" configuration, terminating in face-opposed poles 40 and 42 which are spherically faced to define a mating gap in which the socket 22 is received. The permanent magnet 38 is fixed within the housing 36 by a plurality of mounting studs 44. Thus, a magnetic flux pattern is residually provided through the substance 24 to solidify the substance and lockingly engage the shell 20 to the socket 22.

In general, the shell 20 and the socket 22 are formed of non-magnetic material, e.g. brass, plastic, or the like, affording a smooth ball-and-socket mechanical coupling. As indicated, when the platform 10 is to be locked in position, the permanent magnet 38 provides sufficient magnetic flux through the substance 24 to essentially solidify that substance thereby interlocking the surfaces of the mechanical coupling. Those surfaces may be released by a magnetic shorting bar or bypass bar 46 as shown in FIG. 1. The bar 46 is pivotally attached to the base block 12 so as to be conveniently and easily moved into and out of shorting relationship (across the poles 40 and 42) with the magnet 38. The bar 46 may comprise a solid beam of soft iron having a substantial cross-sectional area which is pivotally held on a panel 48 by a hinge 50 for motion relative to the base block 12.

Considering actual use of the structure as shown in FIGS. 1 and 2, assume that it is desired to tilt the platform 10 from the horizontal to an angle of 20 degrees with respect to both horizontal faces of the base block 12. To accomplish such compound tilting, first the bar 46 is swung to a closed position into the base block 12 substantially as depicted in phantom in FIG. 2. As a result, the magnetic field provided by the magnet 38 is substantially shorted through the bar 46 with the result that relatively little magnetic flux is passed through the socket and substance 24 (offering substantially greater magnetic reluctance). Therefore, the susbtance 24, as generally well known in the prior art, becomes a somewhat-viscous liquid. As a consequence, the platform 10 can be tilted, manually or as by the mechanism 14, to the desired position, because the ridges 28 encounter only a viscous liquid.

After the desired tilting is accomplished, about both axes, the bar 46 (FIG. 1) is pivotally withdrawn from the base block 12 (to the position as shown in FIG. 1), with the result that the magnetic field lines of force now pass through the substance 24. The magnetic field within the substance 24 converts it into a virtual solid, thereby positively locking the shell 20 by meshed, rigid engagement with the grooves 30 and the ridges 28. Thus, the platform is stable, rigid and easily adjusted.

It is to be noted, that any of a variety of magnetic structures may be incorporated to replace the magnet 38. For example, an electromagnet may be substituted to eliminate the bar 48, as well known in the prior art. Additionally, as disclosed below by another embodiment, the mechanical coupling may take a variety of different forms. Furthermore, the substance 24 may take other forms, as for example, compounds which may be readily converted from a solid to a liquid by the application of heat. In this regard, another detailed exemplary structure hereof is set forth in FIG. 3 and includes such a substance.

Referring now to FIG. 3, a structure is shown for interconnecting a pair of shafts that are held in somewhat-opposing relationship. That is, the structure of FIG. 3 includes stub shafts 52 and 54 generally in opposed relationship, each of which includes a threaded section for mating engagement with load-bearing columns (not shown). The shafts 52 and 54 are generally affixed to a mechanical coupling 56 which comprises a form of mechanical universal joint. More specifically, the coupling 56 includes a spherical housing 58 which is ported to be connected to the shafts 52 and 54. In this regard, the shaft 52 extends through a bore in the housing 58 which bore mates with a sealing collar 60. Similar collars 62 and 64 are provided in quadrature spaced relationship with the collar 60. The collars 62 and 64 are employed in connecting the housing 68 to the shaft 54.

The shaft 52 extending from the collar 60 terminates in a ridged cylindrical structure 66 comprising a generally cylindrical section bearing the plurality of elongate axially-extending ridges 68. The ridges 68 couple the shaft 52 to the substance 70 (contained in the housing 58) when it is in a solid form. However, when the substance 70 is liquified the structure 66 may be revolved allowing the entire shaft 52 to turn relatively freely. Actually, the structure 66 may comprise any of a wide variety of somewhat-circular configuration members having protrusions or other abutments theron for engaging the substance 70 in meshed relationship.

The collars 62 and 64 receive shafts 72 and 74 respectively, the external ends of which are connected to a yoke 76 which is in turn centrally connected to the shaft 54. The internal ends of the shafts 72 and 74 are connected to lock disks 78 and 80 respectively which define protrusions, specifically ridges 84. The ridges 84 on the disks 78 and 80 meshingly engage the substance 70 (when it is solid) to be locked in position; however, upon liquification of the substance 70, the disks 78 and 80 are free to revolve in the collars 72 and 74 thereby enabling the yoke 76 to swing so as to establish various angular relationships between the shafts 52 and 54.

As indicated above, the substance 70 is solidified to provide a fixed relationship between the shafts 52 and 54, and is liquified at a time when it is desired to alter that relationship. Of course, the substance 70 may take a wide variety of different forms, e.g. metals; (as lead, solder and many other low-melting point alloys) hydrocarbons (as wax, plastic and so on); magnetic sludge (as described above); or any substance that may be relatively-easily transformed between its liquid and solid states.

In a related regard, the substance-engaging members, e.g. structure 66 and disks 78 and 80, may also comprise a variety of different materials. For example, the fluted sections, or ridges 68 and 84, may comprise material of high heat conductivity along with their associated shafts 52, 72 and 74. In such a structure, heat applied to these shafts is readily carried to the ridges and reduces the adjacent volumes of the substance 70 to a liquid, thereby enabling the coupling to be moved to accommodate a desired adjustment.

In another form of the structure as shown in FIG. 3, in which the substance 70 comprises a heat-liquification substance, the internal mechanical surfaces are fitted with electrical-resistance heating wire. Specifically, a pair of wires extend from terminals 86 (in the shaft 52) to a heater into the housing 58 that is mounted in heat exchange relationship with ridges 68. For example, the wires 88 are connected to a heating coil 89 mounted within the structure 66 and insulated therefrom. As a result, the ridges 68 may be rapidly heated to a temperature well above the melting temperature of the substance 70. Similarly, a pair of terminals 90 in the shaft 54 are connected by wires 92 to heating elements 91 in each of the disks 78 and 80. Thus, the volumes of the substance 70 which lie contiguous to the disks 78 and 80 and the structure 66 may be melted to a liquid form to accommodate a desired adjustment. In this regard, a variety of power supply units and electrical connectors are readily adaptable to supply current through the terminals 86 and 90 to the heating elements 89 and 91. Of course, upon accomplishing the desired positional relationship, between the shafts 52 and 54, the electrical potential is removed from the terminals 86 and 90 and the stubstance 70 is permitted to cool sufficiently to solidify. As a result, the shafts 52 and 54 are again locked in fixed relationship to support an applied load.

In a structural form somewhat similar to that shown in FIG. 3, the locking structure may comprise a mechanical spring force mechanism as illustrated in the structure of FIG. 4. A universal coupling 100 (dual pivot) is provided between stub shafts 102 and 104 which are mechanically similar to the shafts 52 and 54 as previously described with reference to FIG. 3. However, in the structure of FIG. 4, the retentive or locking forces are provided by springs mounted within the structure of the coupling 100, rather than a liquifiable solid.

Specifically, the coupling of FIG. 4 includes: a pair of yokes 106 and 108 which are affixed to the internal ends of the shafts 102 and 104 respectively. The yoke 106 carries an internal post 110 extending perpendicular to the shaft 102. A coil spring 112 is fixed between the post 110 and a keyed face plate 114, bearing a friction surface 116 which normally abuts aginst a disk 118, terminating the shaft 102. The plate 114 is urged against surface 116 by the spring 112; however, bores 120 in the yoke 106 facilitate the insertion of pins 124 to urge the plate 114 inwardly (on guide keys or rails 127) to disengage the disk 118 from the friction surface 116. Thus, the shaft 102 is released from locking relationship in the coupling 100. In this manner, the operation of the shaft 102 is somewhat related to the operation of the shaft 52 as previously described with reference to the structure of FIG. 3.

In a related fashion, the shaft 104 (FIG. 4) operates somewhat similarly to the shaft 54 (FIG. 3) as previously described. The specific structure associated with the shaft 104 includes internal extensions 130 and 132 from the yoke 108 which are rigidly affixed to the yoke to extend generally perpendicular to the shaft 104. The extensions 130 and 132 abut opposed friction-surface pads 134 and 136 respectively having extensions 138 which are keyed into the post 110. The pads 134 and 136 are held spaced-apart by an attached coil spring 140 so that by compressing the spring 140 these members may be moved toward each other, with their extensions in a slot 141, defined sliding in the post 110. Unless the spring 140 is compressed, the pads 134 and 136 are urged outwardly into positive engagement with the faces of extensions 130 and 132 so as to lock those extensions against rotary movement, and in turn locking the yoke 108. Again, adjustment of the yoke 108 (and the shaft 104) is accomplished by inserting pins 143 and 144 through the hollow extensions 130 and 132 respectively to compress the spring 140 as a result of sliding engagement between the pads 134 and 136 and the post 110.

Considering the operation of the structure of FIG. 4, it will be readily apparent that by inserting the pins to compress the springs 112 and 140, locking engagement with the internal surfaces is released and the desired universal-coupling adjustment may be accomplished. Thereafter, upon removal of the pins the internal surfaces are again engaged, locking the unit so as to provide a fixed angular relationship between the shafts 102 and 104.

Still another mechanical embodiment hereof, is shown in FIG. 5. As illustrated, the opposed shafts 150 and 152 are adjustable with relationship to each other. The shaft 150 is threaded and is internally terminated in a head 154 which engages the shaft to a yoke 156. The yoke 156 matingly receives a boss 158 that is integral with the shaft 152 and extends perpendicular thereto. The opposed ends of the boss 158 carry threaded studs 160 and 162 which extend through opposed bores in the yoke 156 to receive internally threaded lock knobs 164 and 166. Again, the structure generally comprises a universal-joint coupling provided between a pair of shafts, e.g. shafts 150 and 152, which may be locked in different positions. To release the shaft 150, the lock knob 168 is simply turned back from the yoke 156. Similar relief for the shaft 152 is accomplished by threadably disengaging the lock knobs 164 and 166 from the yoke 156. Thereupon, the shafts 150 and 152 may be adjustably positioned to the desired angular relationship after which the lock knobs are turned down tight against the yoke 156, again locking the shafts together.

From a consideration of the above, it may be seen that the structure hereof may be employed utilizing various forms thereof, to accomplish an effective adjustable support or mounting structure. Furthermore, it is apparent that the structure hereof may be widely varied and in this regard, the systems as disclosed herein are deemed merely exemplary embodiments with the result that the scope hereof shall not be restricted accordingly but rather shall be interpreted in accordance with the claims set forth below.

What is claimed is:

1. An adjustable structural unit for supporting a first member variously affixed in relation to a second member, as to support a load applied across said members, comprising:

a mechanical coupling means including a yoke means for swinging movement and pivot means for rotational movement, said mechanical coupling affixed between said first member and said second member to permit limited movement therebetween in the form of angular displacement, said mechanical coupling defining interior surfaces wherein at least one interior surface is rigidly affixed to said first member and at least one other interior surface is rigidly affixed to said second member; and releasable means including a material that may be substantially solidified to interlock said surfaces and may further be rendered fluid to release said surfaces, said releasable means being settable to provide locking engagement between said one interior surface and said other interior surface whereby to variously lock said first member in a fixed angular relationship to said second member and releasable to permit relative movement between said first and second members as defined by said mechanical coupling.

2. An adjustable structural unit according to claim 1 wherein said releaseable means comprises a variable-viscosity medium in relation to applied magnetic field, and wherein said control means comprises means for varying the magnetic field in said medium.

3. An adjustable structural unit according to claim 1 wherein said releasable means comprises a variable-viscosity medium in relation to the temperature thereof, and wherein said control means comprises means for varying the temperature of said medium.

4. An adjustable structural unit according to claim 3 further including heating means affixed contiguous to said medium whereby to vary the temperature thereof.

References Cited

UNITED STATES PATENTS

| | | |
|---|---|---|
| 2,539,534 | 1/1951 | Eckhardt. |
| 2,667,237 | 1/1954 | Rabinow _____ 192—21.5 X |
| 2,749,764 | 6/1956 | Chou _____ 192—21.5 X |
| 3,064,454 | 11/1962 | Sharples. |
| 3,193,068 | 7/1965 | Greve et al. |
| 3,006,668 | 10/1961 | Stewart _____ 287—92 X |

FOREIGN PATENTS 440,670   1/1936   Great Britain.

DAVID J. WILLIAMOWSKY, Primary Examiner

A. V. KUNDRAT, Assistant Examiner

U.S. Cl. X.R.

287—21